Figure 1:
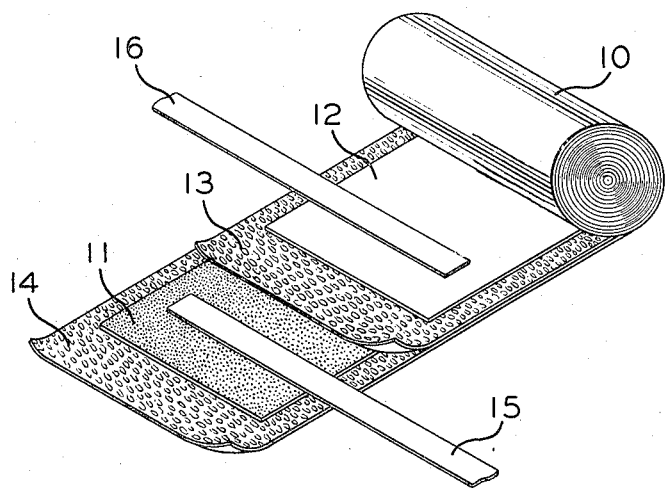

April 8, 1958 S. D. ROSS 2,830,237
ELECTROLYTES
Filed July 1, 1955

INVENTOR.
SIDNEY D. ROSS
BY Connolly and Hutz
HIS ATTORNEYS

2,830,237
ELECTROLYTES

Sidney D. Ross, Williamstown, Mass., assignor to Sprague Electric Company, North Adams, Mass., a corporation of Massachusetts Application July 1, 1955, Serial No. 519,363

5 Claims. (Cl. 317—230)

This invention relates to improved electrolyte systems and more particularly refers to non-aqueous electrolytes for electrolytic devices such as capacitors.

The electrolytic capacitor has been the subject of extended research and large scale use during the last half century. Most capacitors of this type have been made with anodes consisting of formed aluminum. Electrolytes have been selected from numerous categories and the patent and technical literature abounds with suggested ionogens as well as solvents therefor. Despite the multitude of electrolytes which have been disclosed, most electrolytic capacitors employ relatively simple systems containing boric acid or a borate dissolved in a suitable material such as water or ethylene glycol. The so-called dry electrolyte contains only small amounts of free water.

While the electrolytes of the type referred to above are quite suitable for many capacitor applications, they are unsatisfactory for use in capacitors to be subjected to extreme high or low temperatures and other special operating conditions. This deficiency has become most apparent with the development of associated electrical equipment suitable for and requiring high ambient temperatures. Tantalum anodes have become of technical importance as replacements for aluminum anodes because of the greater stability of the formed oxide film. Very simple tantalum capacitors suitable for operation at temperatures more or less above 100° C. have been produced using sulfuric acid as the electrolyte. While sulfuric acid is suitable from a conductivity standpoint, its use introduced additional and serious problems in selection of structural materials, sealing, venting arrangements and the like, particularly since it is an exceptionally corrosive liquid.

It is an object of the present invention to overcome the foregoing and related disadvantages. A further object is to produce new and useful electrolyte systems for electrolytic capacitors. Additional objects will become apparent from the following descriptions and claims.

These objects are attained in accordance with the invention wherein there is produced an electrolyte system comprising an organic salt whose anion is selected from the class containing aromatic ions with a plurality of oxidizing groups, said anions having the ability to oxidize anodic metal surfaces, dissolved in a non-aqueous solvent.

In a more restricted sense the invention is concerned with an electrolytic capacitor having a plurality of electrodes, at least one of said electrodes being a formed valve metal, and a non-aqueous electrolyte contiguous with said electrodes comprising a solute of the salt of polynitro substituted phenol and an alkyl amine having a formula $$[C_aH_{2a+1}]_cNH_{3-c}$$

wherein $a$ is an integer from 2 to 6 and $c$ is an integer from 1 to 3 dissolved in an alkyl phosphate having the formula $$(C_nH_{2n+1})_3PO_4$$

wherein $n$ is an integer from 1 to 4, said solute consisting of from about 1% to about 30% by weight of the total electrolyte.

In its limited and preferred embodiment the invention is concerned with an electrolytic capacitor having an anode and a cathode separated by a porous spacer, said anode consisting of oxide coated tantalum and a non-aqueous electrolyte contiguous with said anode and said cathode consisting essentially of tri-n-butyl ammonium picrate dissolved in tri-n-butyl phosphate, said picrate salt present in from about 4% to about 22% by weight of the total electrolyte.

According to my invention I have found that a special class of organic electrolyte solute introduced into a special non-aqueous solvent can be used as an electrolyte for many types of electrolytic capacitors and other devices in which prior electrolyte systems were unsatisfactory. In particular, my electrolytes show unusual stability at temperatures on the order of 150° C. without at the same time being unsatisfactory for normal operation, as for example, at room temperature. The exceptional nature of my electrolytes is further manifested by the operability at depressed temperatures, i. e. —50° C. and lower.

What I have discovered is that the ionic electrolyte constituent should consist of an organic salt with a particular type of anion. While I am not fully aware of the reasons therefor, it appears that this anion should possess three characteristics.

First, the anion must be an oxidizing agent, thus acting to reform or heal the oxide film on the anode metal if this be of the so-called valve metal type. These organic anions should possess oxidizing action, which means that the anion should have a nitro substituent which will be active in the initial formation or in subsequent reformation of the anode oxide film.

Second, the anion should be of a type which will be absorbed on the anode surface, that is, it should migrate to and form a boundary layer on the metal surface, thus being available for its desired function at any time during the operation of the device. Further, it may act as a pore filling material in the oxide film and contribute to the overall insulating properties of the film.

Third, for optimum stability of the electrolytic capacitor the anion must react with the initial products associated with corrosion or degradation of the protective oxide film on the metal. Such degradation as results in the formation of free radicals is thus immediately terminated before reaching secondary or advanced stages. Therefore, the accidental presence of a chloride ion, for example, normally most destructive to an aluminum anode, will not result in advanced deterioration and corrosion, if the proper electrolyte anion is present.

Following the definition indicated, it has been found that the trinitro phenolate (picrate) and dinitro phenolate anions will perform the desired function.

The cation is to be selected from lower alkyl and hydroxy alkyl amines. These amines which have been found useful in the practice of this invention include:

Propylamine
Dipropylamine
Tripropylamine
Butylamine
Dibutylamine
Tri-n-butylamine
Pentylamine
Tripentylamine
Dipentylamine
Ethylamine
Diethylamine
Triethylamine
Hexylamine
Dihexylamine
Trihexylamine It is thus seen that the scope of the invention extends to picrate salts of lower alkyl substituted amines, which amines may be primary, secondary and tertiary. Particularly suitable are the tertiary type due to their lower resistivity when used in the electrolytes of the invention.

The solvent which forms an integral part of the electrolytic combination of the invention is of the class of the lower alkyl phosphates. This limited class is characterized by a high boiling point (greater than 150° C.) and/or low freezing point, low vapor pressure at elevated temperatures, high dielectric constant and minimum interaction with the dielectric film and effective dissolution of electrolysis products. These alkyl phosphates includes the tertiary esters wherein the alkyl radicals are methyl, ethyl, propyl, isopropyl, n-butyl, n-amyl, iso-amyl and hexyl. Representative solvents of this class with their respective boiling points are as follows:

| Compound: | Boiling point (° C./mm. pressure) |
|---|---|
| Trimethyl phosphate | 197.2/760 |
| Dimethyl ethyl phosphate | 203.3/760 |
| Triethyl phosphate | 216/770 |
| Tripropyl phosphate | 138/47 |
| Tri-n-butyl phosphate | 123/115 |
| Tri-iso-amyl phosphate | 143/3 |
| Butyl di-iso-amyl phosphate | 145/4.5 |

For a more detailed disclosure of non-aqueous solvents for electrolytic capacitor systems refer to my copending application, Serial No. 365,519, filed July 1, 1953, now abandoned.

Because of the use of salts in my electrolytes I find that the conductivity is relatively high even at moderate concentrations of salt in the system, also permitting simple control of the system conductivity. Ordinarily the concentration of the solute to solvent is varied from about 1% solute to about 30% of the solute based on the total weight of the electrolyte, however the preferred range for operation is from 4% by weight of the solute to about 22% by weight of the solute of the total electrolyte. The concentration of the solute will depend upon the particular application having been found that for low temperature operation, that is down to −60° C., a concentration of 22% by weight of the solute to the total electrolyte is particularly useful and for high temperature operation a concentration of about 4% by weight of the solute to the total electrolyte is quite satisfactory. The useful range of solute of my electrolyte is generally from about 1% by weight to about 30%.

The type of anode metal used will, of course, depend upon the nature of the final application. Aluminum and tantalum have both been successfully used as anode metals in high temperature electrolytic capacitors of my invention. However, other valve metals such as titanium, zirconium, magnesium and bismuth may be employed where their particular anodic characteristics are of interest.

In many of the electrolytic capacitor applications it is advantageous to impose a porous spacer between the electrodes so as to obtain mechanical separation of the elements. This is particularly desirable in the convolutely wound type of electrolytic capacitor. This porous spacer must be chemically inactive in the electrolyte, operable at temperatures of at least 150° C. and preferably higher, of relative homogeneity in physical properties, and of a range in thickness of .3 mil to about 3 mils. Suitable spacers include paper, particularly of the kraft type, which may be either uncoated or coated with resins which meet the above requirements, for example, isocyanate cross-linked cellulose acetate and the non-woven types as fiberglass matts. The spacers also include the porous resinous films, particularly the fluorinated ethylenes such as polytetrafluoroethylene and polymonochlorotrifluoroethylene. Such a porous film as polytetrafluoroethylene is fully disclosed in the copending Peck U. S. patent application, Ser. No. 252,236, filed October 20, 1951, now Patent No. 2,790,999. Particularly suitable for the device of the invention is a porous fiberglass film which is coated with polytetrafluoroethylene resin. Such a spacer is sold as Fiber-film by the American Machinery and Foundry Corporation. The porosity of the spacers has been found to greatly influence the dissipation factor, particularly at low temperatures. The preferred porosity range, which values are based upon the Curley porosity test, is about a minimum porosity of 3.00 to about a maximum porosity of 0.10, which values are computed on the number of seconds for 100 cc. of air to flow through the film.

Reference is now made to the appended drawing in which 10 represents a capacitor roll, partially unwound. 11 is the anode of the capacitor, being of the so-called valve metal (for example, aluminum, tantalum, zirconium, titanium) having on its surface an oxide layer which functions as the dielectric. Cathode 12 is made of a valve metal or an inert metal such as silver depending upon the particular application and its inherent requirements. 13 and 14 each represent a porous spacer such as the polytetrafluoroethylene coated fiberglass film, or other well-known types of porous material, imposed between the anode 11 and the cathode 12 for physical separation of the two elements. Spacers 13 and 14 are impregnated with the alkyl amine-picrate conducting mixture of the invention dissolved in a lower alkyl phosphate solvent. Tabs 15 and 16 are connected to the two electrode foils as terminals. Although the anode in the drawing is shown as a foil, the electrolyte of my invention is equally suitable for etched wires and porous pellets.

The following examples of the preparation of the electrolyte salt, the electrolyte system and the electrolyte capacitors further illustrate the practice of my invention.

*Example 1*

The following preparation of tri-n-butyl ammonium picrate is indicative of the general procedure to be followed in the preparation of any of the lower alkyl and lower hydroxy alkyl substituted ammonium picrate salts in accordance with the teachings of the invention.

85% picric acid (270 grams; 1 mol), was dissolved in boiling denatured alcohol (750 cc.) in a 2-liter Erwin-Meyer flask, and the hot solution was filtered. The filtrate was heated to redissolve the picric acid, and tri-n-butyl amine (194.5 grams; 1.05 mols; 250 cc.), was added slowly with stirring. This reaction is strongly exothermic and care must be taken to avoid too vigorous boiling during this addition. The salt crystallizes on cooling. When the solution cooled to room temperature, the precipitate was filtered with suction and then washed with 100 cc. denatured alcohol and then with 200 cc. of ether. The salt was air dried and then dried overnight in a vacuum desiccator over sulphuric acid; yield 358 grams (86%); M. P. 104–106° C.

*Example 2*

The so-produced salt was thereafter dissolved in tri-n-butyl phosphate at the desired solute concentration, e. g. 4% by weight of the picrate salt, to form the working electrolyte. This electrolyte was then impregnated into an electrolytic capacitor made up of a ½ mil thick tantalum foil formed to 225 v. in an electrolyte of .1% phosphoric acid by weight in water having 2.25 square inches as the anode, ½ mil thick tantalum foil as the cathode (2.35 square inches) formed to 10 volts in 10% $H_3PO_4$ and two 0.6 mil thick porous polytetrafluoroethylene coated fiberglass spacers between the formed anode and formed cathode. The introduction of the electrolyte into the capacitor structure was by conventional techniques at 25° C. The unit was found to have an operational temperature range extending beyond −55° C. to +150° C., relative constant capacitance over the entire temperature range and is featured by the extremely low dissipation factor over the entire range.

Similar results are possible with the following electrolytes when used in the capacitor structure above:

12% by weight of di-n-butyl ammonium picrate dissolved in tri-n-butyl phosphate.

6% by weight of tripropyl ammonium picrate in tripropyl phosphate.

30% by weight of tri-n-pentyl ammonium picrate in tri-n-amyl phosphate.

8% by weight of hexyl ammonium picrate in butyl di-isoamyl phosphate.

18% by weight of tri-n-butyl ammonium 2,4-dinitrophenolate in tri-n-butyl phosphate.

2% by weight of triethyl ammonium picrate in triethyl phosphate.

3% by weight of dipropyl ammonium picrate in trimethyl phosphate.

Figure 2:
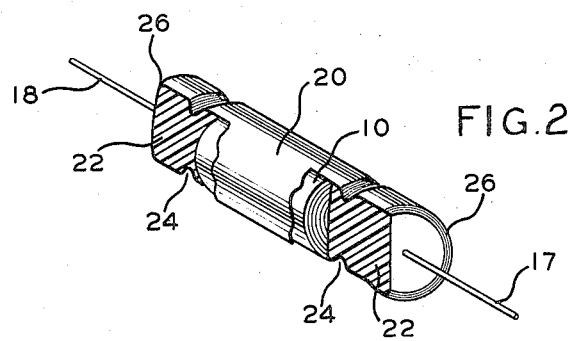

Electrical devices such as the capacitor of the invention using the novel electrolyte which are operable over the extreme temperature range, previously indicated in the specification, of necessity undergo marked physical structural changes when transversing the entire breadth of this range. For this reason the containment of the liquid electrolytes prevents possible difficulties unless measures are taken to prevent their egress. Further, it is necessary to maintain the electrodes fully insulated one from the other. For these reasons the temperatures stabile resin dielectrics, such as polytetrafluoroethylene, are finding rapid acceptance in dielectric gaskets and washers of high resistivity and chemical inertness. It has been found practical to contain the electrolyte within the electrical component by utilizing a structure such as that set forth in cross-sectional view in Fig. 2 of the appended drawing. In Fig. 2 a type of end seal is pictured. The section is shown as 10 with the terminal lead wires 17 and 18 extending axially from the can 20. The end seal consists of a polytetrafluoroethylene gasket 22 crimped at 24 and rolled over at 26, thus exerting substantial compressional forces on it so as to prevent the egress of the electrolyte along the terminal lead wires 17 and 18. A further sealing construction which is suitable utilizes that similar to the seal forming the basis of the U. S. patent application, Serial No. 340,710, filed March 6, 1953, which has been modified by the insertion of a steel spring washer at the bottom of the cup-like liner or alternatively tube-like container. This structure is particularly suitable to capacitor structures wherein the cathode constitutes the can or enclosing structure or alternatively the cathode is grounded to the container. The crimping assembly such as the capacitors is forced downward against a steel spring washer so that it remains in a continuous stressed state, which thus serves to yield sufficient pressure over the entire temperature range so as to prevent egress of the liquid electrolyte from the electrical device and thus maintain the anodes fully immersed in the electrolyte.

As many apparently widely different embodiments of this invention may be made without departing from the spirit and scope hereof, it is to be understood that the invention is not limited to the specific embodiments hereof except as defined in the appended claims.

This is a continuation-in-part of my copending United States patent application, Serial No. 287,316, filed May 12, 1952, now Patent No. 2,759,132.

What is claimed is:

1. An electrolytic capacitor having a plurality of electrodes, one of said electrodes being a formed valve metal, and a non-aqueous electrolyte contiguous with said electrodes comprising a solute of the salt of a polynitro substituted phenol and a lower alkyl amine dissolved in a lower alkyl phosphate.

2. The capacitor of claim 1 wherein the polynitro substituted phenol is picric acid.

3. The capacitor of claim 1 wherein the polynitro substituted phenol is 2,4-dinitrophenol.

4. An electrolytic capacitor having a plurality of electrodes, one of said electrodes being a formed valve metal and a non-aqueous electrolyte contiguous with said electrodes comprising a solute of the salt of polynitro substituted phenol and an alkyl amine having a formula $$(C_aH_{2a+1})_cNH_{3-c}$$

wherein $a$ is an integer from 2 to 6 and $c$ is an integer from 1 to 3 dissolved in an alkyl phosphate having the formula $$(C_nH_{2n+1})_3PO_4$$

wherein $n$ is an integer from 1 to 4, said solute consisting of from about 1% to about 30% by weight of the total electrolyte.

5. An electrolyte capacitor having an anode and a cathode separated by a porous spacer, said anode consisting of oxide coated tantalum, a non-aqueous electrolyte contiguous with said anode and said cathode consisting essentially of tri-n-butyl ammonium picrate dissolved in tri-n-butyl phosphate, said picrate salt present in from about 1% to about 30% by weight of the total electrolyte.

No references cited.